United States Patent
Wu

(10) Patent No.: US 7,654,356 B2
(45) Date of Patent: Feb. 2, 2010

(54) FOLDING ELECTRIC SCOOTER

(75) Inventor: Donald P. H. Wu, Sinfong Township, Hsinchu County (TW)

(73) Assignee: Pihsiang Machinery Manufacturing Co., Ltd., Hsinchu (TW)

( * ) Notice: Subject to any disclaimer, the term of this patent is extended or adjusted under 35 U.S.C. 154(b) by 369 days.

(21) Appl. No.: 11/779,222

(22) Filed: Jul. 17, 2007

(65) Prior Publication Data
US 2009/0020350 A1 Jan. 22, 2009

(51) Int. Cl.
*B62K 15/00* (2006.01)
(52) U.S. Cl. ............. 180/208; 280/287; 296/181.7
(58) Field of Classification Search ............ 180/208; 280/278, 287; 296/181.7
See application file for complete search history.

(56) References Cited
U.S. PATENT DOCUMENTS

| | | | |
|---|---|---|---|
| 3,354,975 A * | 11/1967 | Stuart | 180/208 |
| 5,312,126 A * | 5/1994 | Shortt et al. | 280/287 |
| 7,125,080 B1 * | 10/2006 | Jarema et al. | 297/411.32 |
| 7,451,848 B2 * | 11/2008 | Flowers et al. | 180/208 |
| 2008/0245592 A1 * | 10/2008 | Wu | 180/208 |

* cited by examiner

*Primary Examiner*—Paul N Dickson
*Assistant Examiner*—Drew Brown
(74) *Attorney, Agent, or Firm*—Banger Shia

(57) ABSTRACT

A folding electric scooter comprises a chassis. The front end of the chassis is disposed with a front wheel and a handlebar used to control the direction of the front wheel. The handlebar is a folding structure. The rear end of the chassis is pivotally coupled with a rear rack. The rear rack is disposed with a rear wheel, a motor and a battery. The motor and the battery are used to offer the power to the rear wheel. In addition, the rear rack is disposed with a folding four-bar linkage, which forms the seat. By such arrangements, when the folding electric scooter is not in use, the four-bar linkage can be folded to fold the seat, and the handlebar can be synchronously folded, thus minimizing the whole volume to facilitate the transportation and the storage.

8 Claims, 11 Drawing Sheets

FOLDING ELECTRIC SCOOTER

BACKGROUND OF THE INVENTION

1. Field of the Invention

The present invention relates to a folding electric scooter, and more particularly to a folding electric scooter whose seat and handlebar can be folded to minimize the whole volume for facilitating transportation and storage.

2. Description of the Prior Art

The electric scooter has been developed for a long time. As for the elders or the persons who are unable to walk, the electric scooter really acts as an excellent vehicle. The electric scooter made by the general producer comprises a fixed frame, so its whole volume is big, thus causing problems during transportation or storage. In order to solve the abovementioned problems, an electric scooter structure disclosed in Taiwan Pat. No. 092219550 is disposed with a folding device on the handlebar stem thereof. When the electric scooter is not in use, the handlebar stem can be folded to reduce the volume. This design can only fold the handlebar stem, but the seat cushion and the back cushion cannot be folded, so the folding effect is limited.

Additionally, a seat folding structure for an electric scooter disclosed in Taiwan Pat. No. 088212636 is to provide a design that a back cushion of the seat can be folded onwards to abut against the seat cushion. Only the back cushion of the seat of the electric scooter can be folded in this design, so the total size of the electric scooter cannot be properly reduced, thus still causing the storage problem. Hence, it is necessary to make the improvement.

In order to effectively solve the abovementioned relevant problems, based on the accumulative research technology and experience in the field of the electric scooter, after many times of experiments and tries, the applicant of the present invention has developed a folding electric scooter whose seat and handlebar can be synchronously folded.

SUMMARY OF THE INVENTION

The present invention is a folding electric scooter. The folding electric scooter comprises a chassis. The front end of the chassis is disposed with a folding handle bar. The rear end of the chassis is pivotally coupled with a rear rack. The rear rack is disposed with a folding four-bar linkage, which forms a seat. By such arrangements, when the folding electric scooter of the present invention is not in use, the four-bar linkage can be folded to fold the seat, and the handlebar can be synchronously folded, thus minimizing the whole volume of the present invention to facilitate the transportation and the storage.

DETAILED DESCRIPTION OF THE PREFERRED EMBODIMENTS

Figure 1:
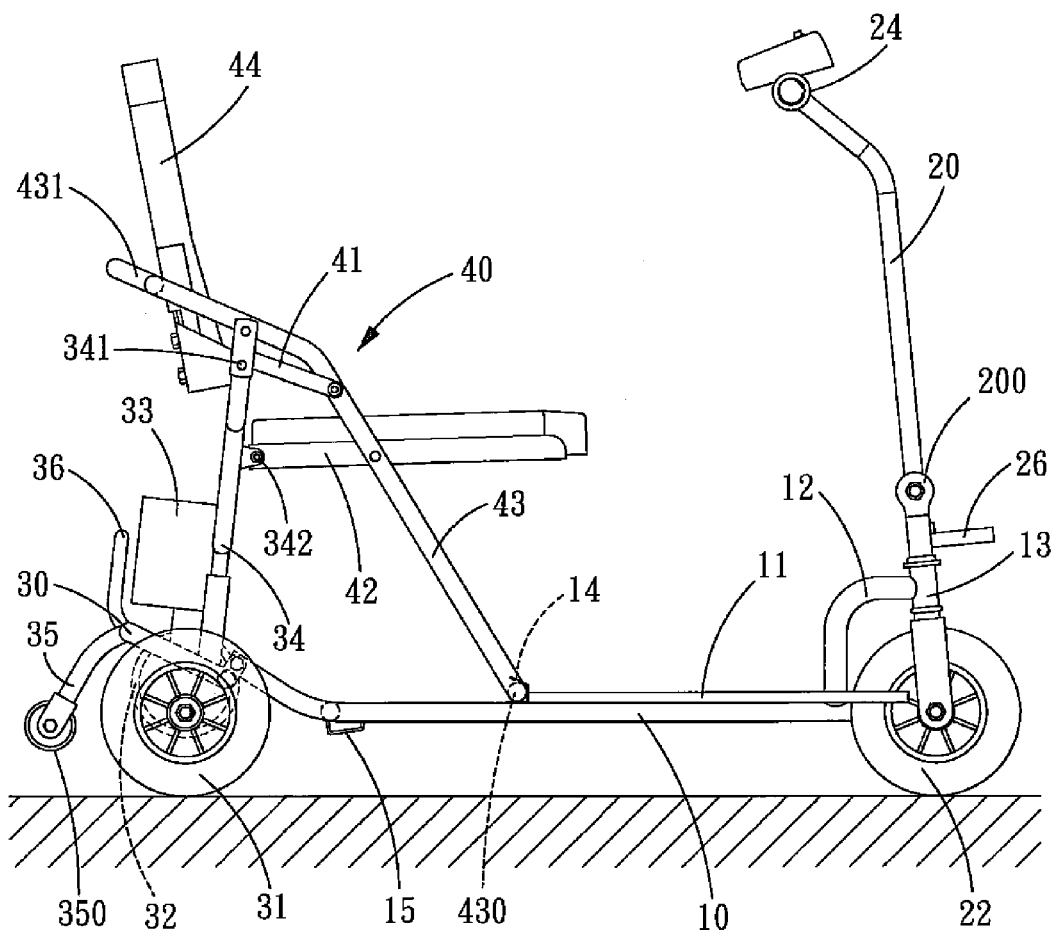
FIG. 1 is a side view of an unfolded folding electric scooter in accordance with the present invention.
Figure 2:
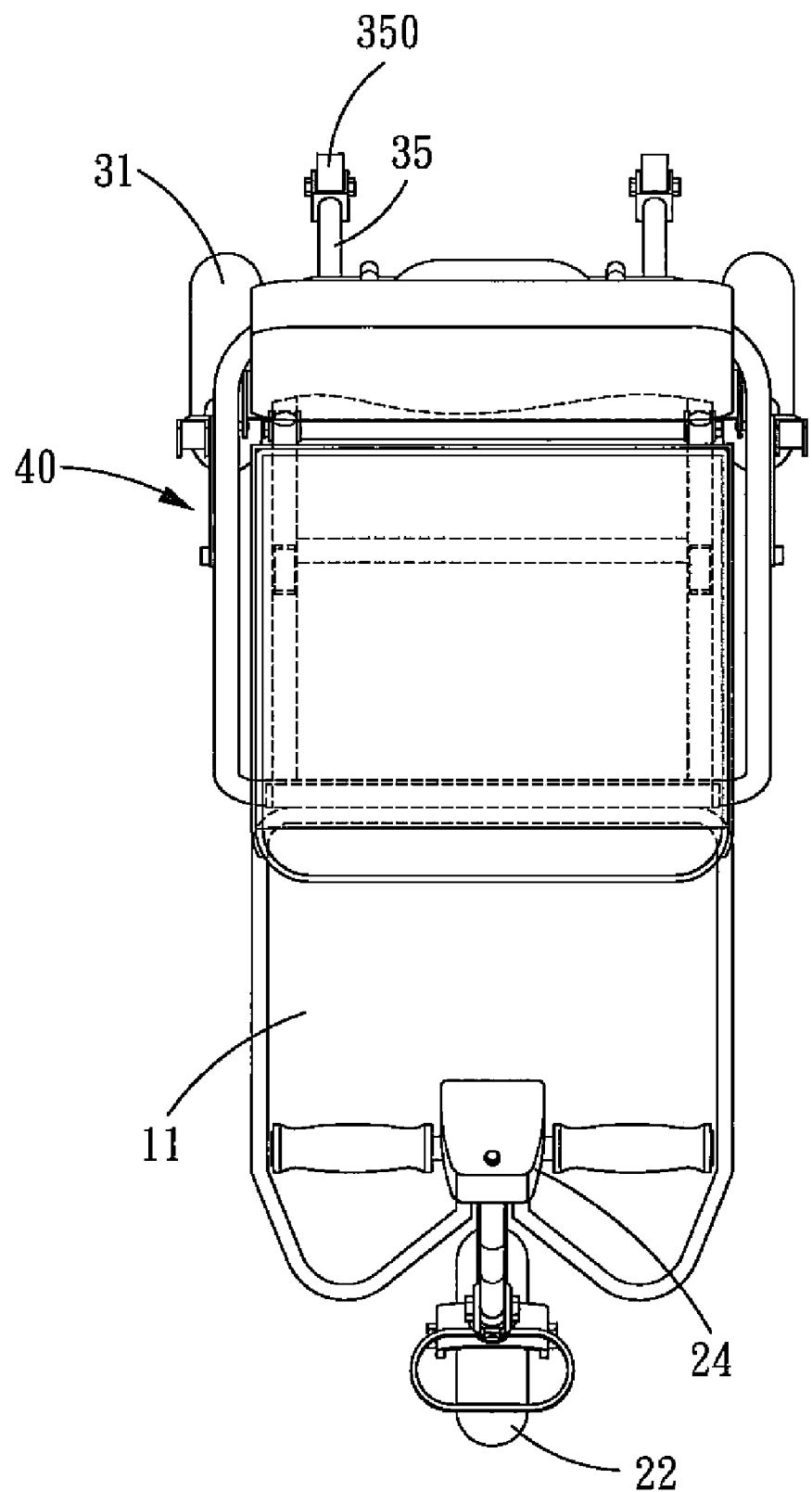
FIG. 2 is a top view of the folding electric scooter in accordance with the present invention.

The present invention will be clearer from the following description when viewed together with the accompanying drawings, which show, for purpose of illustrations only, the preferred embodiment in accordance with the present invention.

Referring to FIGS. 1-5, a folding electric scooter in accordance with the present invention comprises a chassis 10. The front part of the chassis 10 is disposed with a pedal 11 and a connecting element 12 connected with a vertical tube 13. An engaging element 14 is disposed above the chassis 10, and a supporting block 15 is disposed under the chassis 10. At the rear end of the chassis 10 is disposed a pivot shaft 16.

The vertical tube 13 of the chassis 10 is pivotally coupled with a handlebar stem 20, and a folding pivotal coupling device 200 is disposed in the middle of handlebar stem 20. There are various available pivotal coupling devices 200 on the market; so the detailed description is omitted here. The lower end of the handlebar stem 20 is assembled with a front wheel 22, and the upper end of the handlebar stem 20 is disposed with a handlebar 24. A front grip 26 is formed between the pivotal coupling device 200 and the front wheel 22.

The rear end of the chassis 10 is pivotally coupled with a rear rack 30 by the pivot shaft 16, and the rear rack 30 is disposed with a rear wheel 31, a drive motor 32, and a battery 33. The drive motor 32 and the battery 33 are used to offer power to the rear wheel 31. In addition, the rear rack 30 is disposed with two vertical bars 34, and each of the two vertical bars 34 is disposed with an upper pivot 341 and a lower pivot 342. Additionally, the rear rack 30 is disposed with two extension rods 35 which are extended to the rear of the rear wheel 31. Each of the two extension rods 35 is disposed with an anti-tip wheel 350, and a guard rod 36 is disposed behind the rear rack 30.

Further, the rear rack 30 is disposed with a folding four-bar linkage 40, which forms the seat of the electric scooter in accordance with the present invention. The four-bar linkage 40 is a bilaterally symmetrical structure, and only one side of the four-bar linkage 40 can be seen in the side view. For facilitating the presentation, the structure and operational mode of one side of the four-bar linkage 40 will be described as follows. The four-bar linkage 40 includes the vertical bar 34, an upper cross bar 41, a lower cross bar 42 and a support bar 43. One end of the upper cross bar 41 is pivotally coupled with the upper pivot 341 of the vertical bar 34, and the other end of the upper cross bar 41 is pivotally coupled with the support bar 43. One end of the lower cross bar 42 is pivotally coupled with the lower pivot 342 of the vertical bar 34, and the middle part of the lower cross bar 42 is pivotally coupled with the support bar 43. The lower cross bar 42 is mounted with a seat cushion 420. The lower end of the support bar 43 is disposed with an engaging rod 430 used to engage with an engaging element 14 of the chassis 10, and the upper end of the support bar 43 is disposed with a rear grip 431, a back cushion 44 which are pivotally coupled with the vertical bar 34. The rear side of the back cushion 44 can be positioned against the rear grip 431, so as to be supported by it.

Figure 3:
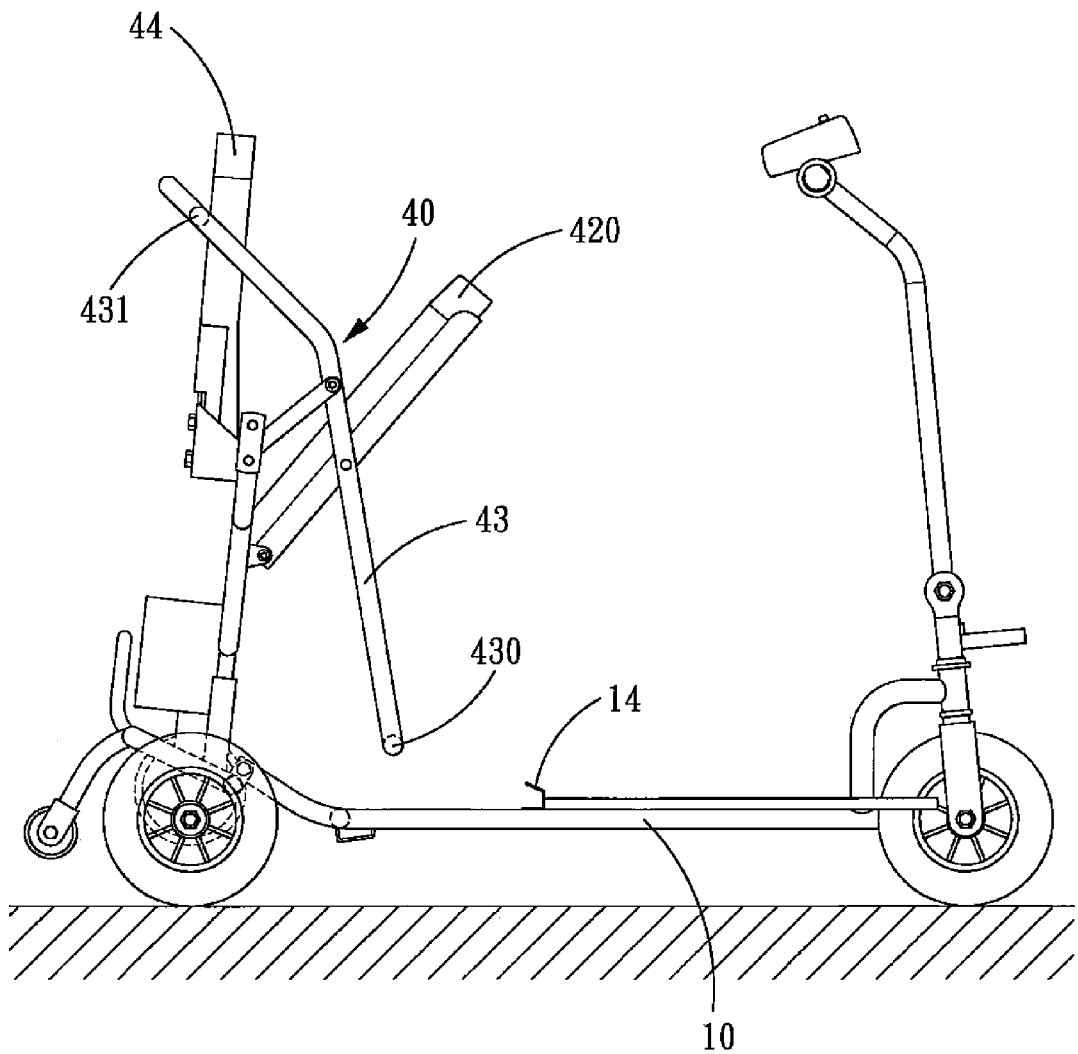
FIG. 3 is a side view of showing that the four-bar linkage of the folding electric scooter in FIG. 1 is being folded in accordance with the present invention.
Figure 4:
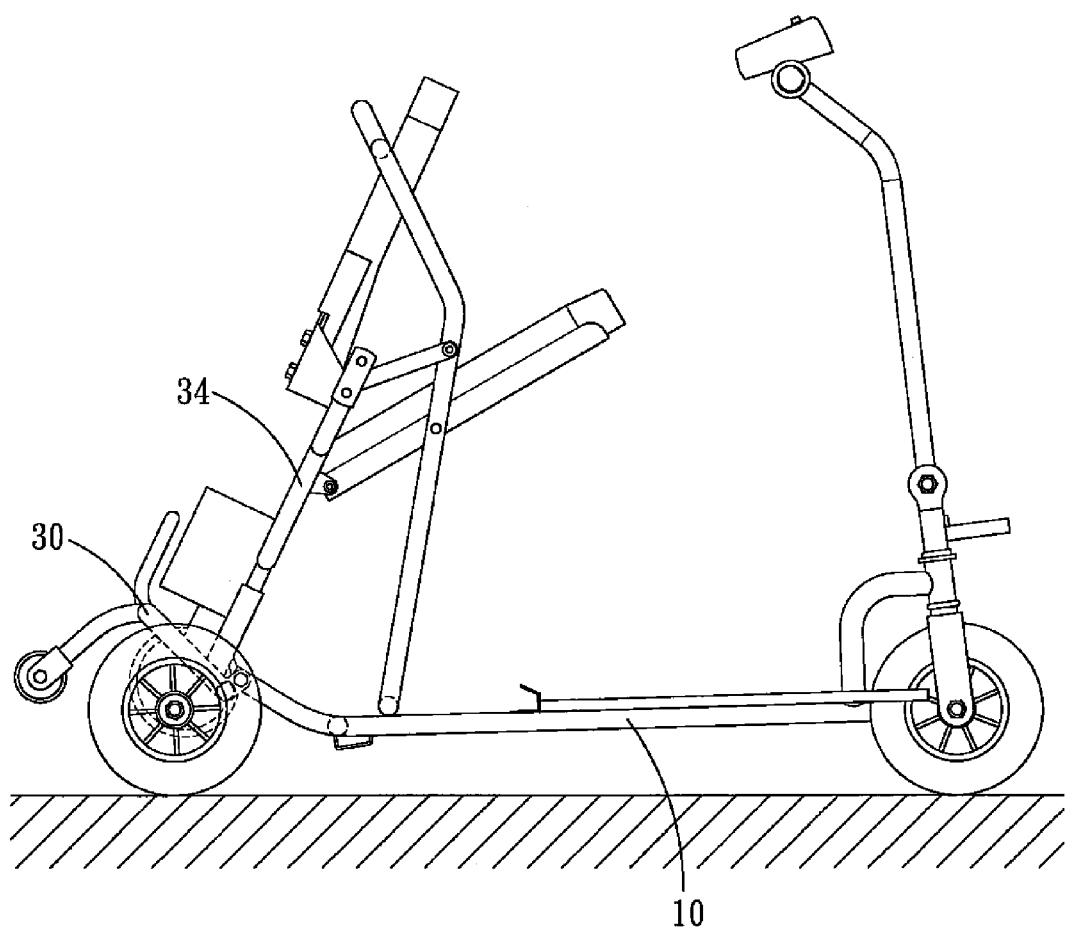
FIG. 4 is a side view of showing that the four-bar linkage of the folding electric scooter in FIG. 1 is being folded in accordance with the present invention.
Figure 5:
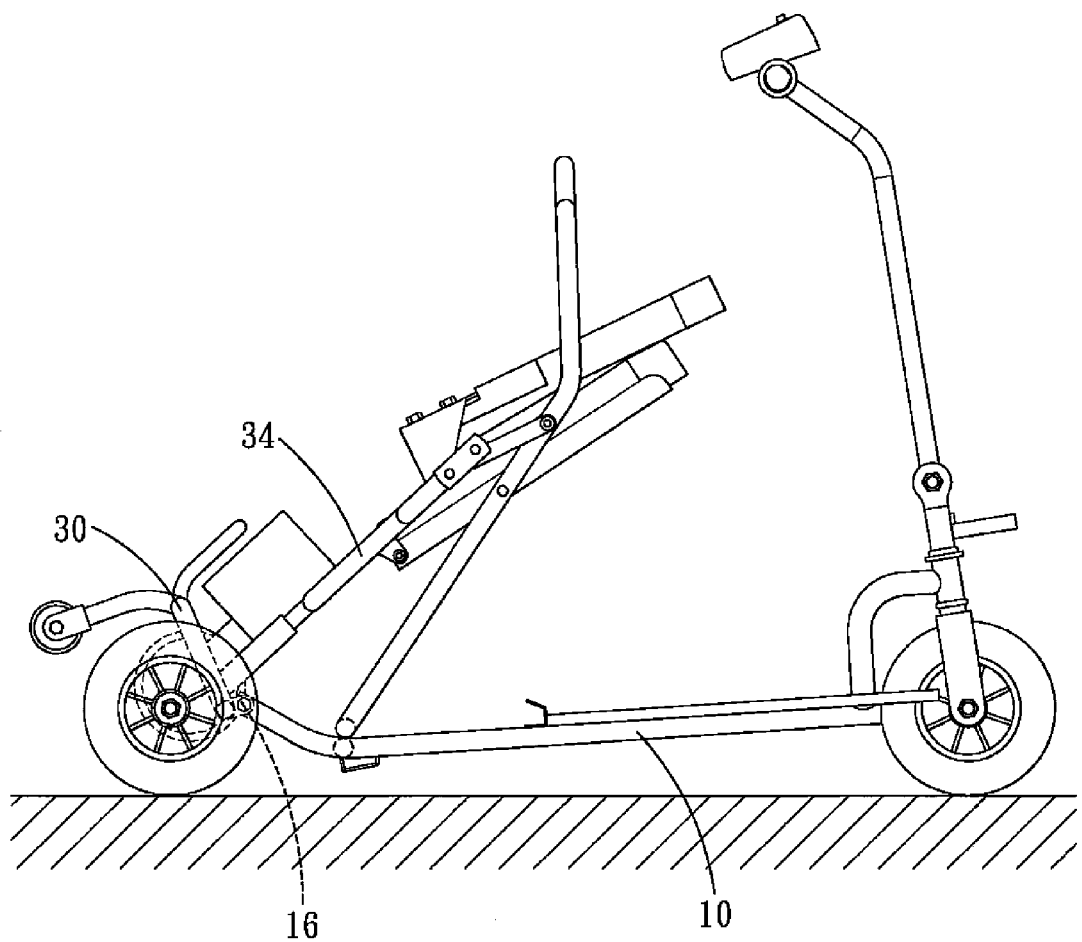
FIG. 5 is a side view of showing that the four-bar linkage of the folding electric scooter in FIG. 1 is being folded in accordance with the present invention.

When the folding electric scooter of the present invention is not in use, it can be folded. Referring to FIG. 3, firstly, the design of the four-bar linkage 40 can disconnect the engaging rod 430 disposed at the lower end of the support bar 43 from the engaging element 12 of the chassis 10, and then the front end of the seat cushion 420 will be lifted upwards. The four-bar linkage 40 can be folded like a standard four-bar linkage structure, and the back cushion 44 can be synchronously pushed to rotate forward by the rear grip 431.

Figure 6:
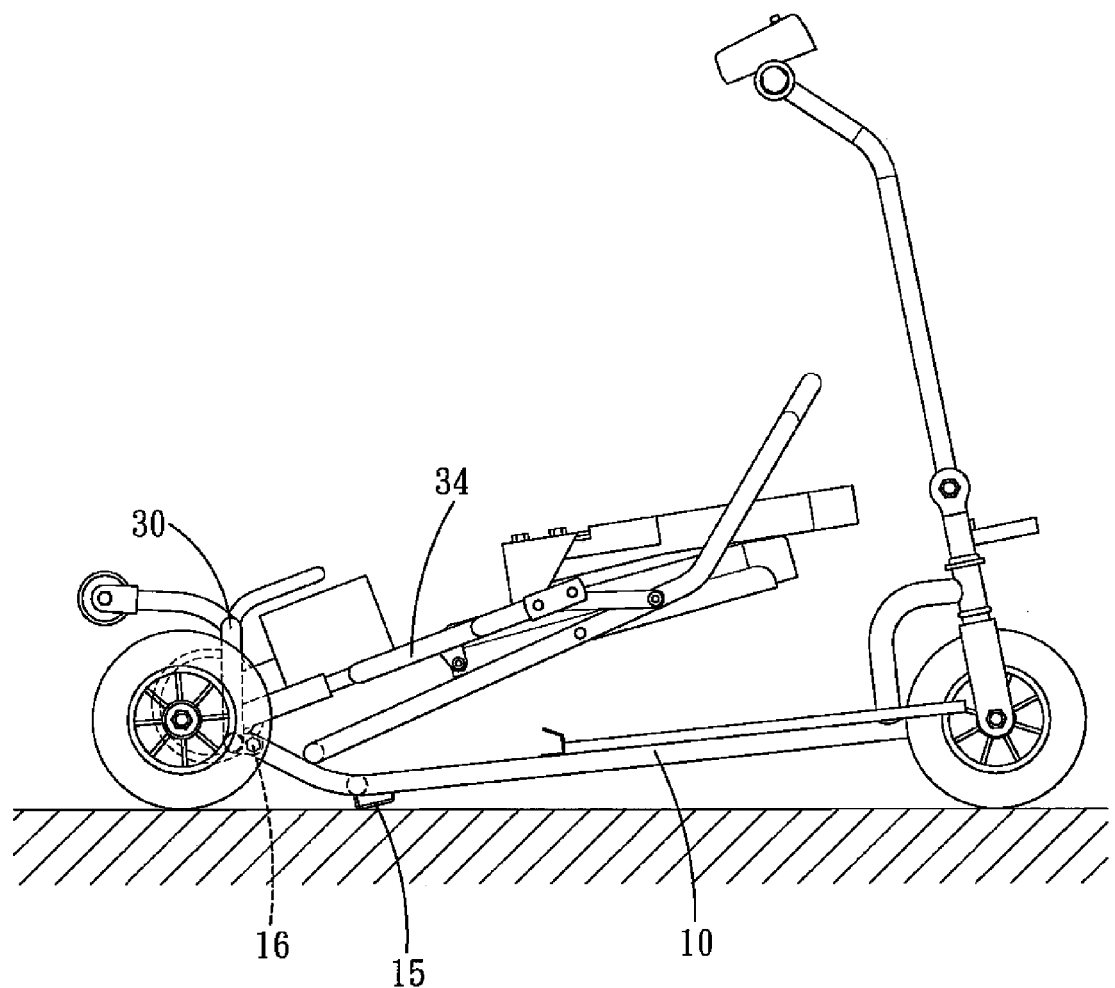
FIG. 6 is a side view of showing that the four-bar linkage of the folding electric scooter in FIG. 1 is being folded in accordance with the present invention.
Figure 7:
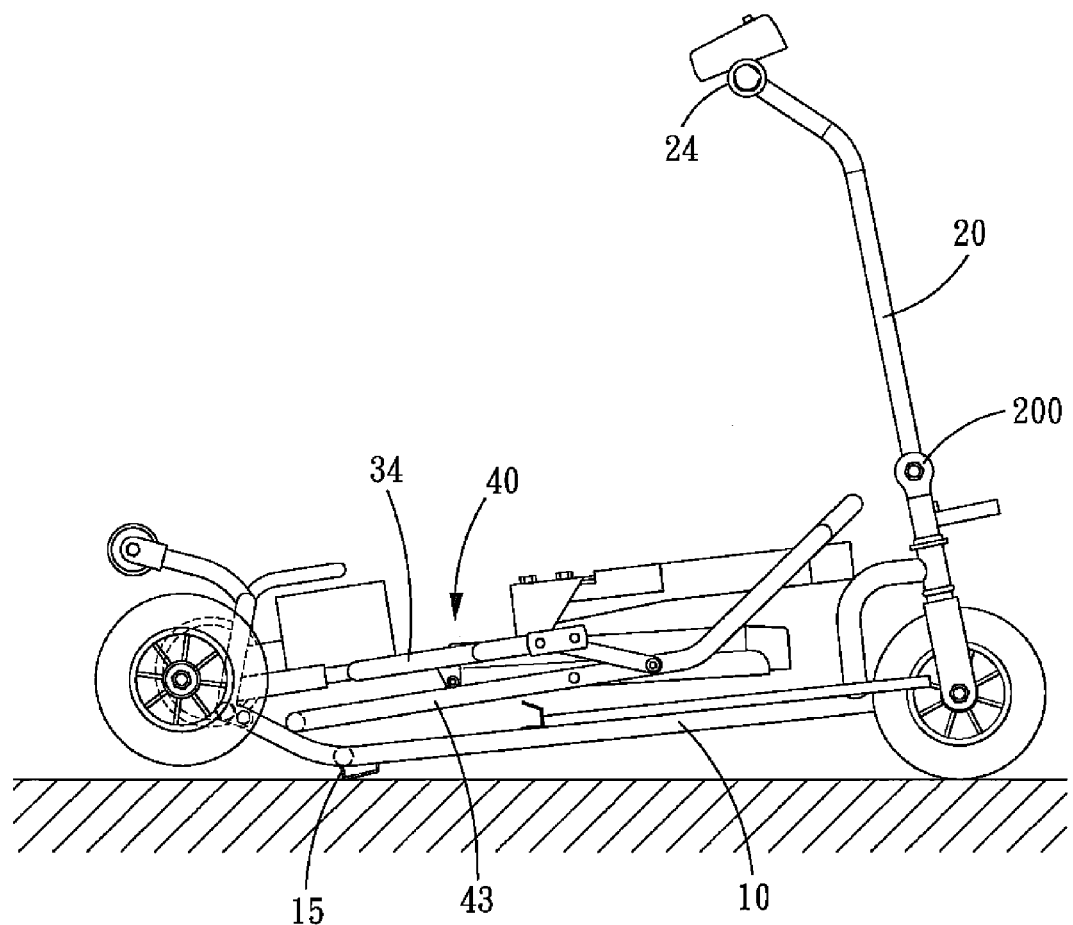
FIG. 7 is a side view of showing that the four-bar linkage of the folding electric scooter in FIG. 1 is being folded in accordance with the present invention.

After that, as shown in FIGS. 3-8, the vertical bar 34 of the rear rack 30 will be caused to rotate downward, and then the rear rack 30 will rotate downward around the pivot shaft 16. When the vertical bar 34 rotates downward to the position as shown in FIG. 6, the supporting block 15 under the chassis 10 will touch the ground. When the vertical bar 34 of the rear rack 30 continues to rotate downward to the position as shown in FIG. 7, the four-bar linkage will be folded completely.

After the four-bar linkage 40 is folded, the pivotal coupling device 200 of the handlebar stem 20 can be used to fold the handlebar stem 20. When the handlebar 24 is folded to a position adjacent to the support bar 43 as shown in FIG. 8, the volume of the folding electric scooter will be minimized for facilitating the transportation and the storage.

Figure 8:
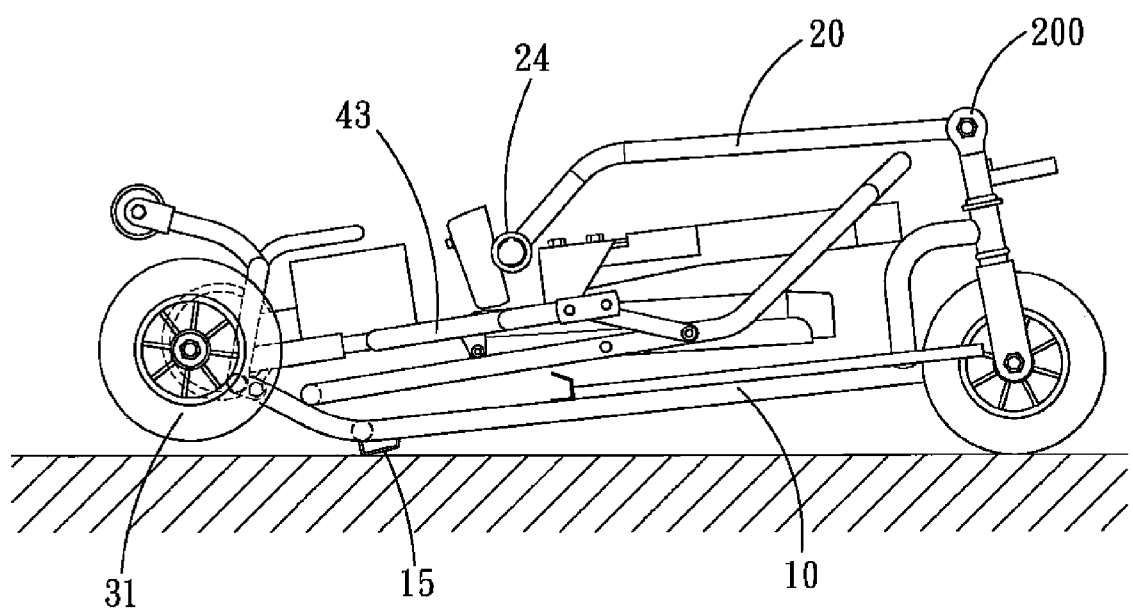
FIG. 8 is a side view of showing that the handlebar stem of the folding electric scooter in FIG. 1 is folded through the pivotal coupling device in accordance with the present invention.

As shown in FIG. 8, when the folding electric scooter has been folded, the chassis 10 is supported by the supporting block 15. At the moment, the rear wheel 31 is suspended from the ground. By such a design, the rear wheel 31 serving as a drive wheel can be prevented from touching the ground, thus avoiding the damage of the interior parts of the drive motor 32 caused by the rotation of the rear wheel 31 driving the drive motor 32 to rotate in counterclockwise direction.

Figure 9:
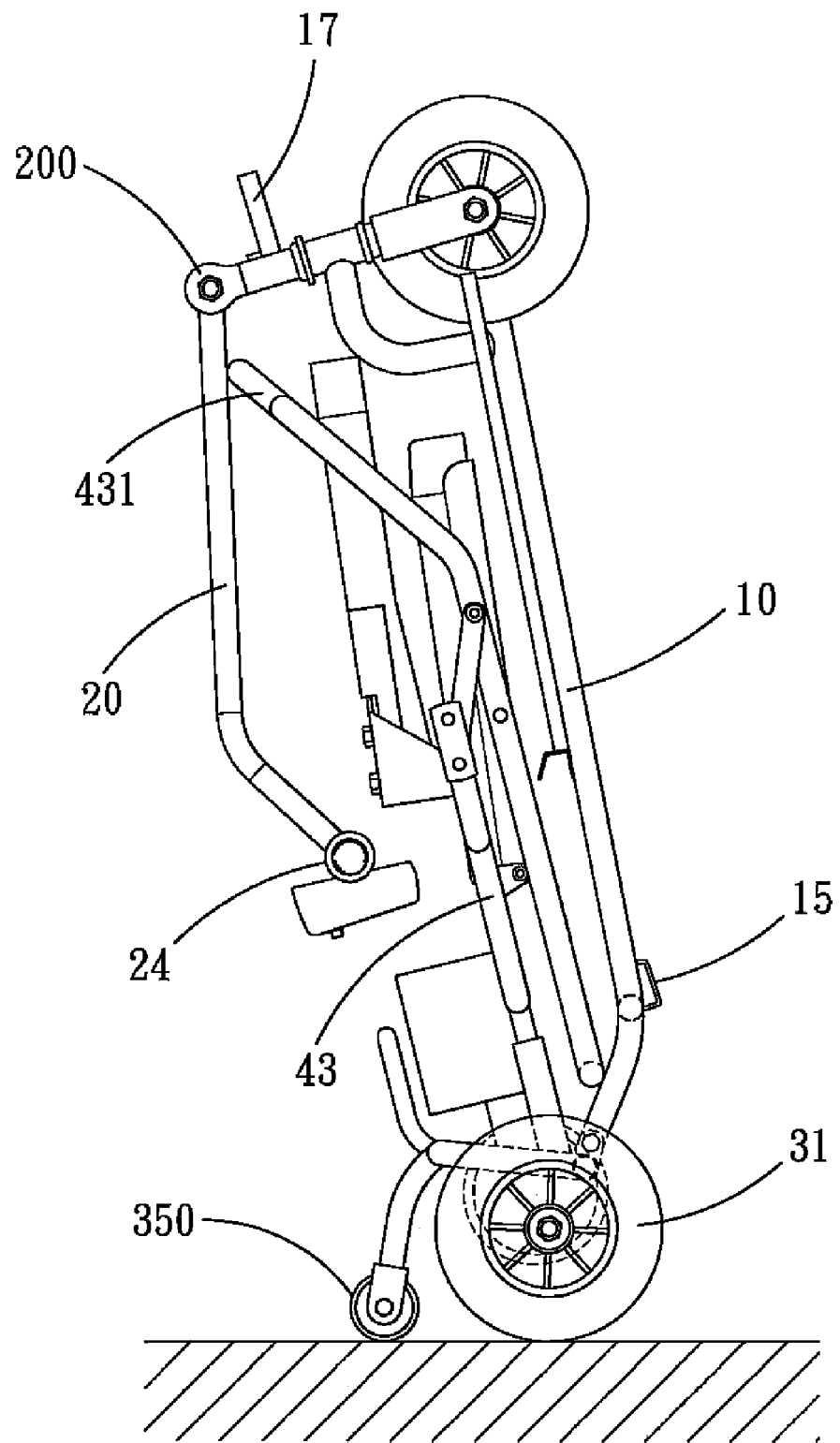
FIG. 9 is a side view of showing that the folding electric scooter which is folded as shown in FIG. 8 is set up by the user through the rear wheel and the anti-tip wheel.
Figure 10:
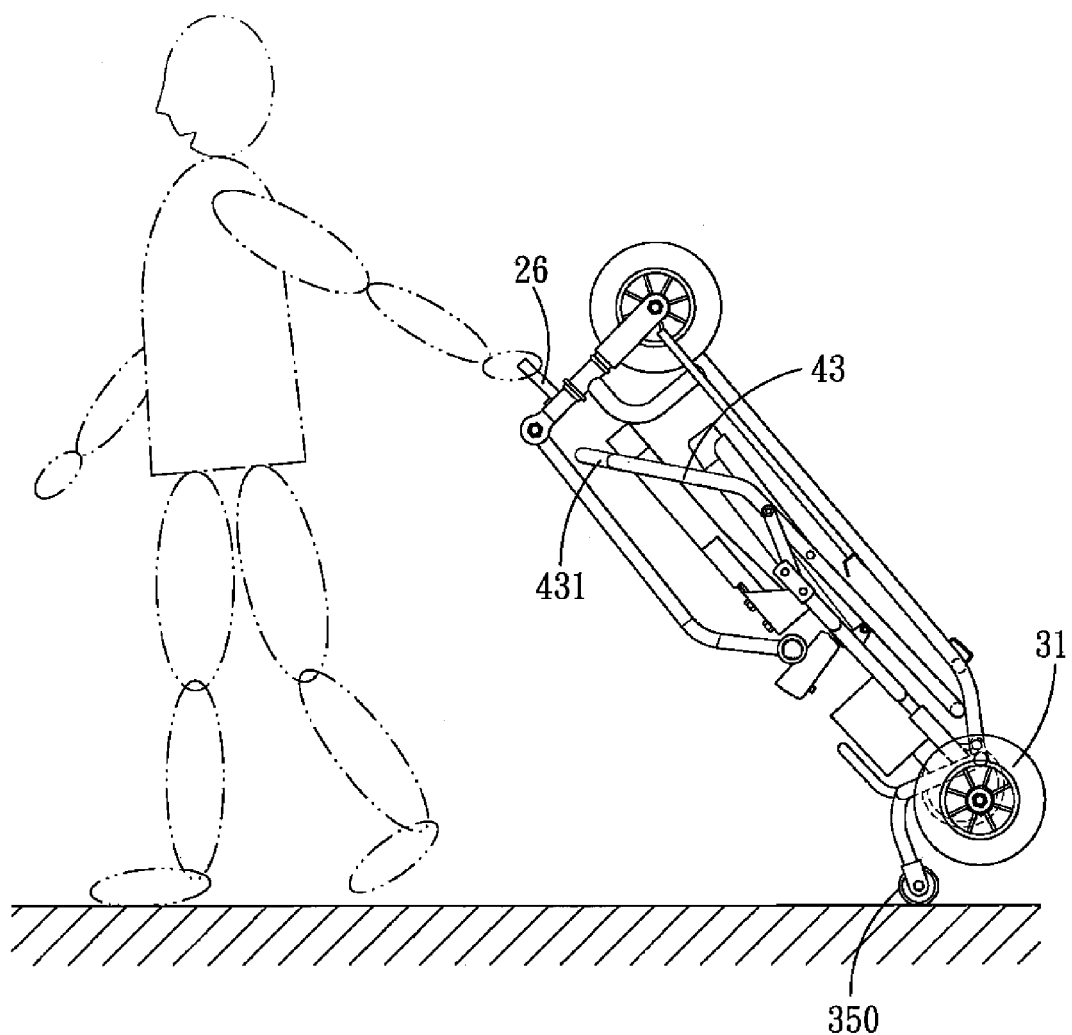
FIG. 10 is a side view of showing that the folding electric scooter which is folded as shown in FIG. 8 is pulled by the user through the front grip.
Figure 11:
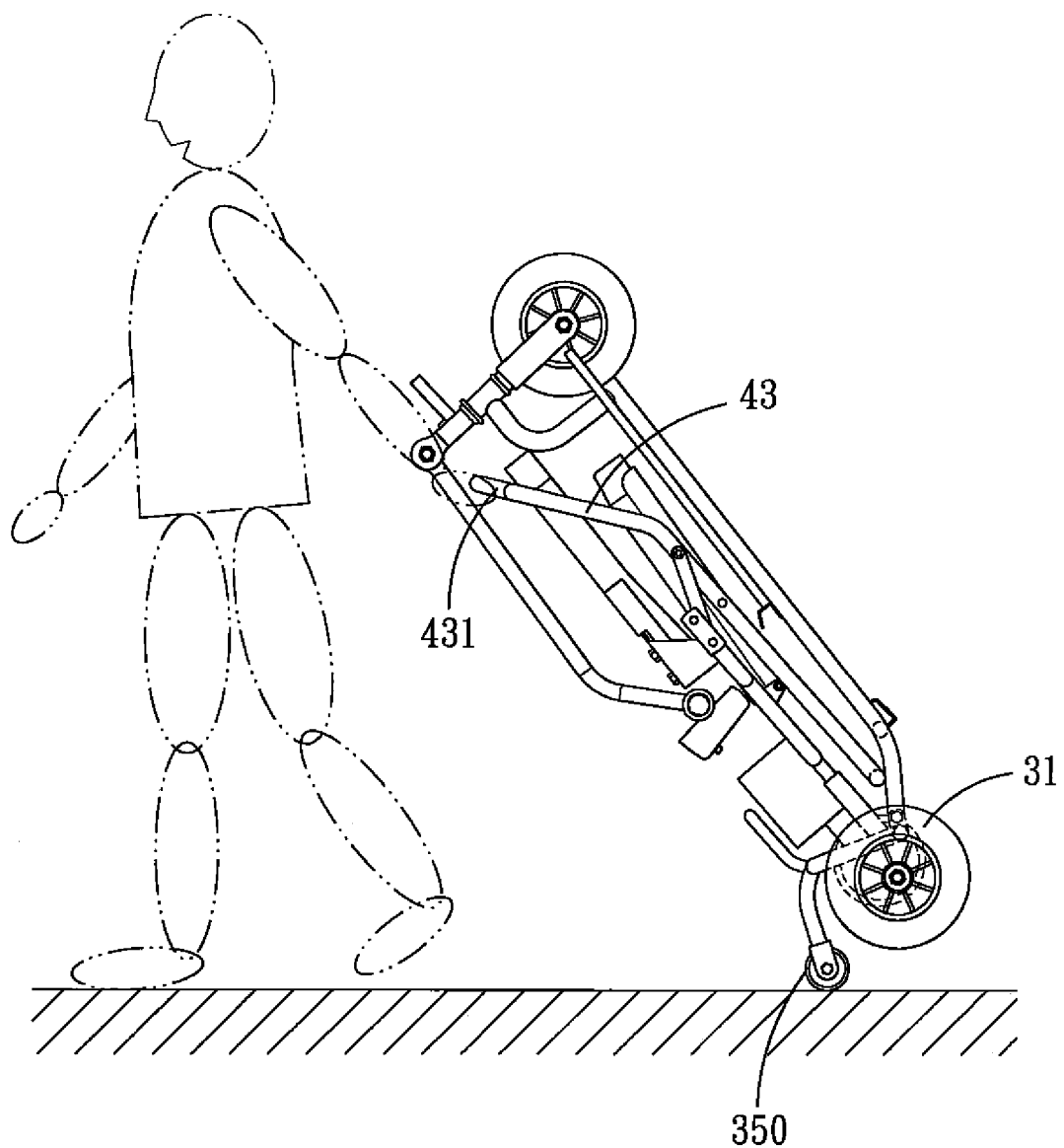
FIG. 11 is a side view of showing that the folding electric scooter which is folded as shown in FIG. 8 is pulled by the user through the rear grip.

Referring to FIGS. 9-11, when the folded electric scooter of the present invention is to be moved away, it can be set up, and the anti-tip wheel 350 can be made to touch the ground for suspending the rear wheel 31 to avoid the abrasion. Thereby, the user can pull the rear grip 431 of the support bar 13.

The folding electric scooter described above and shown in the drawings is only one of the embodiments in accordance with the present invention, however it can be modified and changed in various manners, such as: an equivalent substitute of the four-bar linkage, or the changes and modifications of the respective components in the shape.

To summarize, the folding electric scooter of the present invention comprises a chassis. The front end of the chassis is disposed with a front wheel and a handlebar used to control the direction of the front wheel. The handlebar is a folding structure. The rear end of the chassis is pivotally coupled with a rear rack. The rear rack is disposed with a rear wheel, a motor and a battery. The motor and the battery are used to offer the power to the rear wheel. In addition, the rear rack is disposed with a folding four-bar linkage, which forms the seat. By such arrangements, when the folding electric scooter of the present invention is not in use, the four-bar linkage can be folded to fold the seat, and the handlebar can be synchronously folded, thus minimizing the whole volume of the present invention to facilitate the transportation and the storage.

While we have shown and described various embodiments in accordance with the present invention, it is clear to those skilled in the art that further embodiments may be made without departing from the scope of the present invention.

What is claimed is:

1. A folding electric scooter comprising a chassis, a front end of the chassis being connected with a vertical tube, the vertical tube being pivotally assembled with a handlebar stem, a lower end of the handlebar stem being assembled with a front wheel, an upper end of the handlebar stem being disposed with a handlebar, and a folding pivotal coupling device being disposed in the middle of the handlebar stem, a rear end of the chassis being disposed with a rear rack, the rear rack being disposed with a rear wheel, a motor and a battery, the motor and the battery being used to offer power to the rear wheel; the folding electric scooter is characterized in that:

the rear rack is disposed with a folding four-bar linkage, which forms a seat, the four-bar linkage is a bilaterally symmetrical structure and includes a vertical bar disposed on the rear rack, an upper cross bar, a lower cross bar and a support bar, the vertical bar is disposed with an upper pivot and a lower pivot, one end of the upper cross bar is pivotally coupled with the upper pivot of the vertical bar, and the other end of the upper cross bar is pivotally coupled with the support bar, one end of the lower cross bar is pivotally coupled with the lower pivot of the vertical bar, and a middle part of the lower cross bar is pivotally coupled with the support bar, the lower cross bar is disposed with a seat cushion, an engaging element is disposed above the chassis, a lower end of the support bar is disposed with an engaging rod to engage with the engaging element of the chassis.

2. The folding electric scooter as claimed in claim 1, wherein an upper end of the support bar is disposed with a rear grip, and a back cushion is pivotally coupled with the vertical bar, a rear side of the back cushion is positioned against the rear grip.

3. The folding electric scooter as claimed in claim 1, wherein the rear end of the chassis is disposed with a pivot shaft, and the rear rack is pivotally coupled to the rear end of the chassis by the pivot shaft.

4. The folding electric scooter as claimed in claim 3, wherein a supporting block is disposed under the chassis.

5. The folding electric scooter as claimed in claim 1, wherein the front end of the chassis is connected with the vertical tube by a connecting element.

6. The folding electric scooter as claimed in claim 1, wherein a pedal is disposed at a front part of the chassis.

7. The folding electric scooter as claimed in claim 3, wherein the rear rack is disposed with two extension rods extended to a rear of the rear wheel, and each of the two extension rods is disposed with an anti-tip wheel at one end thereof.

8. The folding electric scooter as claimed in claim 3, wherein a guard rod is disposed behind the rear rack.

\* \* \* \* \*